United States Patent
Bush et al.

(10) Patent No.: US 10,524,025 B2
(45) Date of Patent: Dec. 31, 2019

(54) COMMUNICATION SYSTEM AND METHOD FOR SCHEDULING COMMUNICATIONS WITHIN A TIME SENSITIVE NETWORK

(71) Applicant: General Electric Company, Schenectady, NY (US)

(72) Inventors: Stephen Francis Bush, Niskayuna, NY (US); Joel Frederick Markham, Niskayuna, NY (US); Andrew William Berner, Waterford, NY (US)

(73) Assignee: General Electric Company, Schenectady, NY (US)

( * ) Notice: Subject to any disclaimer, the term of this patent is extended or adjusted under 35 U.S.C. 154(b) by 280 days.

(21) Appl. No.: 15/199,368

(22) Filed: Jun. 30, 2016

(65) Prior Publication Data

US 2018/0006956 A1 Jan. 4, 2018

(51) Int. Cl.
*H04L 12/28* (2006.01)
*H04Q 9/00* (2006.01)

(52) U.S. Cl.
CPC ........... *H04Q 9/00* (2013.01); *H04Q 2209/20* (2013.01); *H04Q 2209/826* (2013.01)

(58) Field of Classification Search
CPC ......... H04L 45/02; H04L 45/74; H04L 45/22; H04L 69/22; H04L 45/70
See application file for complete search history.

(56) References Cited

U.S. PATENT DOCUMENTS 7,339,948 B2 3/2008 Balasubramanian et al.
7,675,919 B2 3/2010 Vestal
2002/0097726 A1* 7/2002 Garcia-Luna-Aceves ................... H04L 47/215 370/395.31
2003/0007453 A1* 1/2003 Ogier ....................... H04L 47/17 370/229
2003/0016630 A1* 1/2003 Vega-Garcia ........... H04L 29/06 370/252
2003/0067653 A1* 4/2003 Aicklen .................. H04L 45/00 398/101

(Continued)

FOREIGN PATENT DOCUMENTS

CN 102780581 B 10/2014

OTHER PUBLICATIONS

Emfinder et al., Analysis, Verification, and Management Toolsuite for Cyber-Physical Applications on Time-Varying Networks (Work in Progress), N/A, N/A, N/A.

(Continued)

*Primary Examiner* — Atique Ahmed
(74) *Attorney, Agent, or Firm* — Buckley, Maschoff & Talwalkar, LLC

(57) ABSTRACT

A communication system includes one or more node devices having routing circuitry configured to receive data from one or more other node devices within a communication network and to send the data to at least one other node device or a final destination device and a scheduling controller configured to generate schedules for sending the data through the routing circuitry within the communication network. The scheduling controller communicates with one or more other scheduling controllers in the one or more other node devices in generate the schedules for sending the data through the communication network.

10 Claims, 6 Drawing Sheets

(56) References Cited

U.S. PATENT DOCUMENTS

| | | | |
|---|---|---|---|
| 2005/0036495 A1* | 2/2005 | Wishneusky | H04L 47/527 370/395.4 |
| 2007/0042706 A1* | 2/2007 | Ledeczi | G01S 5/0289 455/3.01 |
| 2008/0084920 A1* | 4/2008 | Okazaki | H04B 1/707 375/146 |
| 2009/0031008 A1* | 1/2009 | Elliott | H04L 61/1517 709/220 |
| 2011/0167147 A1 | 7/2011 | Andersson et al. | |
| 2013/0003680 A1* | 1/2013 | Yamamoto | G01S 5/0205 370/329 |
| 2013/0091170 A1* | 4/2013 | Zhang | G06Q 10/06313 707/783 |
| 2013/0201857 A1* | 8/2013 | Bhargava | H04K 3/222 370/252 |
| 2015/0043384 A1* | 2/2015 | Hui | H04L 41/12 370/255 |
| 2015/0169369 A1 | 6/2015 | Baskaran et al. | |
| 2017/0351630 A1* | 12/2017 | Li | G06F 13/4027 |

OTHER PUBLICATIONS

Thiele et al., Real-time calculus for scheduling hard real-time systems, Circuits and Systems, 2000. Proceedings. ISCAS 2000 Geneva. The, May 2000, vol. 4, pp. 101-104.

Meyer et al.,Extending IEEE 802.1 AVB with Time-triggered Scheduling: A Simulation Study of the Coexistence of Synchronous and Asynchronous Traffic, N/A, N/A, N/A.

Deshpande et al., Coordinated Sampling to Improve the Efficiency of Wireless Network Monitoring, Networks, 2007. ICON 2007. 15th IEEE International Conference on, Nov. 19-21, 2007, pp. 353-358.

Szymanski, An Ultra-Low-Latency Guaranteed-Rate Internet for Cloud Services, IEEE/ACM Transactions on Networking, Feb. 2016, vol. 24, Issue 1, pp. 123-136.

* cited by examiner

COMMUNICATION SYSTEM AND METHOD FOR SCHEDULING COMMUNICATIONS WITHIN A TIME SENSITIVE NETWORK

FIELD

Embodiments of the present disclosure generally relate to systems and methods for communicating data in networks.

BACKGROUND

Various types of control systems communicate data between different sensors, devices, user interfaces, etc., in order to enable control operations of other powered systems. For example, locomotives, automobiles, surgical suites, power plants, etc., include many systems that communicate with each other in order to control operations of the locomotives, automobiles, surgical suites, and power plants.

The operations of these powered systems may rely on on-time and accurate delivery of data frames among various devices. Failure to deliver some data at or within designated times may result in failure of the powered system, which can have disastrous consequences. For example, the failure to deliver sensor data to a control system of a locomotive or rail vehicle system can result in the locomotive or rail vehicle system not applying brakes early enough to avoid a collision. Other control systems may fail to implement protective measures to avoid damage or injury to the systems or other equipment if data is not supplied at or within the designated times. Without timely information, feedback control systems cannot maintain performance and stability.

Some systems may use a time sensitive network (TSN) to communicate data. Communications within a TSN may be scheduled using a single device (e.g., an offline scheduling system) that assumes fixed, non-changing paths through the network nodes between communicating devices (e.g., writers and readers). The TSN schedules are developed offline and then loaded onto network devices. This can require that the offline scheduling system has accurate knowledge of the network topology, network devices, and configuration, and that the schedule is developed in a centralized location resulting in a static file to be uploaded after the schedule is generated. This can be a time-consuming process, particularly for small changes in the network, and can be prone to errors.

Additionally, some scheduling systems generate schedules that assume fixed communication paths through the TSN. This can result in inefficient and/or ineffective schedules for communications. As a result, some time sensitive communications may not reach addressed recipients (e.g., readers) in time and/or an unnecessarily reduced amount of bandwidth may be available for use by non-time sensitive communications, such as rate constrained communications and "best effort" communications.

BRIEF DESCRIPTION

In one embodiment, a node device includes routing circuitry configured to receive data from one or more other node devices within a communication network and to send the data to at least one other node device or a final destination device and a scheduling controller configured to generate schedules for sending the data through the routing circuitry within the communication network. The scheduling controller communicates with one or more other scheduling controllers in the one or more other node devices in generate the schedules for sending the data through the communication network.

In one embodiment, a method includes determining (at one or more scheduling controllers in a time sensitive network) one or more of estimates of data to be routed through different communication paths in the time sensitive network, amounts of the data to be communicated through different node devices of the time sensitive network, and/or time periods in which different communications of the data occur during a communication cycle of the same node device of the time sensitive network. The method also includes generating (at the one or more scheduling controllers in the time sensitive network) schedules for sending the data through the different node devices based on one or more of: the estimates of data to be routed through the different communication paths by avoiding scheduling data to be communicated through at least one of the communication paths having a larger estimate of data, the amounts of the data to be communicated through the different node devices by avoiding scheduling data to be communicated through at least one of the node devices having a larger amount of the data to be communicated through the at least one of the node devices, and/or the time periods in which different communications of the data occur during the communication cycle of the node device by scheduling the different communications to occur during non-overlapping time periods in the communication cycle.

In one embodiment, a communication system includes node devices configured to route data packets between one or more writer devices of a data distribution service and one or more reader devices of the data distribution service according to schedules of the node devices. Each of the node devices includes a scheduling controller that determines the schedule for the corresponding node device.

BRIEF DESCRIPTION OF THE DRAWINGS

The subject matter described herein will be better understood from reading the following description of non-limiting embodiments, with reference to the attached drawings, wherein below.

DETAILED DESCRIPTION

Certain embodiments of the subject matter described herein provide systems and methods that distribute the scheduling tasks for time sensitive networks (TSN). The TSN may be formed from several node devices that communicate with each other. In contrast to a network having a single scheduler or scheduling device that determines when different communications occur through these node devices, one or more embodiments of the inventive subject matter described herein divide or place this scheduling tasks on many, or all, of the node devices that participate in the TSN.

Figure 1:
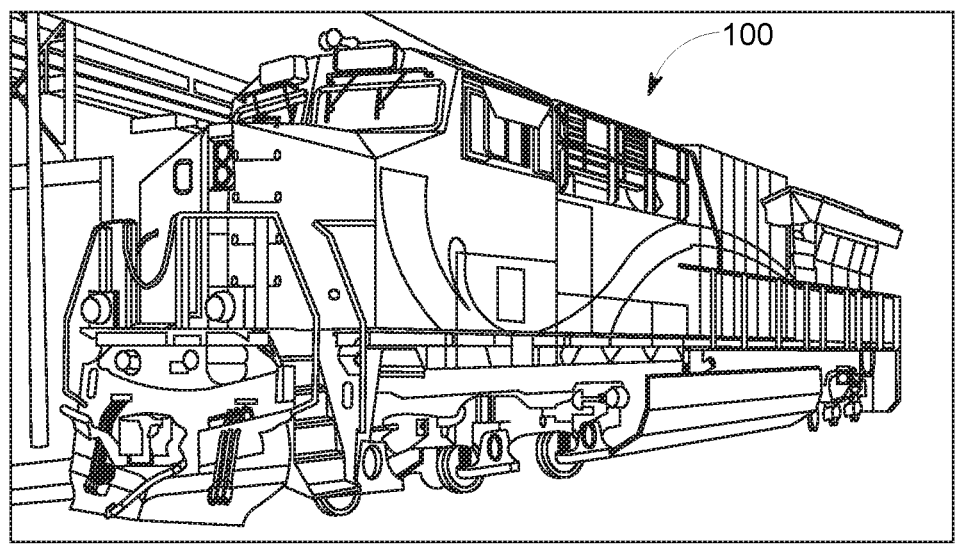
FIG. 1 illustrates one example of a powered system having a control system that uses one or more embodiments of subject matter described herein.
Figure 2:
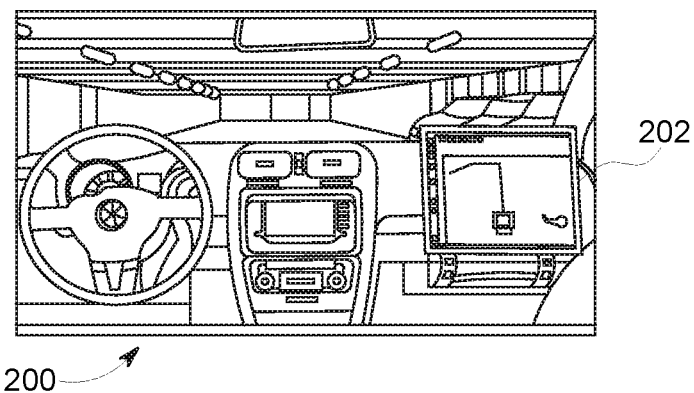
FIG. 2 illustrates another example of a powered system having a control system that uses one or more embodiments of subject matter described herein.
Figure 3:
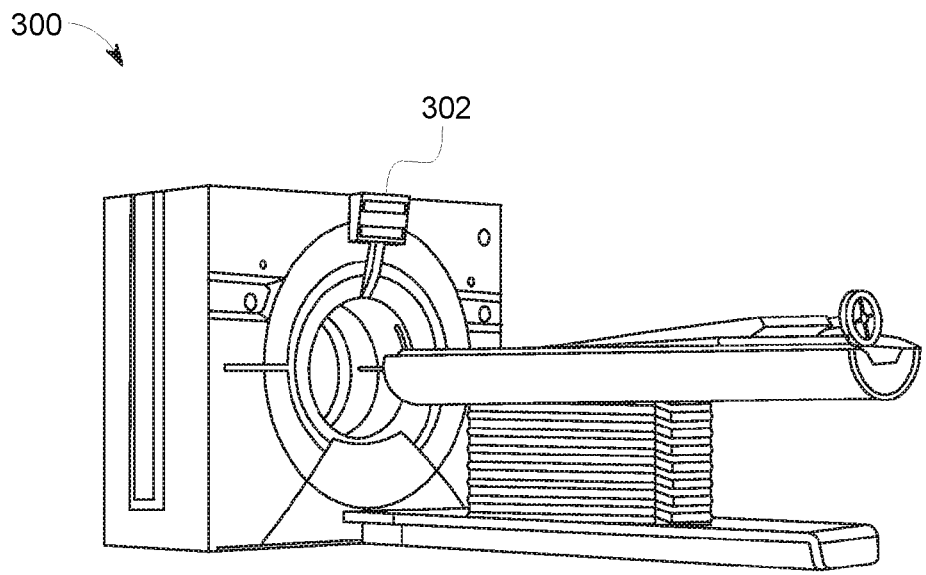
FIG. 3 illustrates another example of a powered system having a control system that uses one or more embodiments of subject matter described herein.
Figure 4:
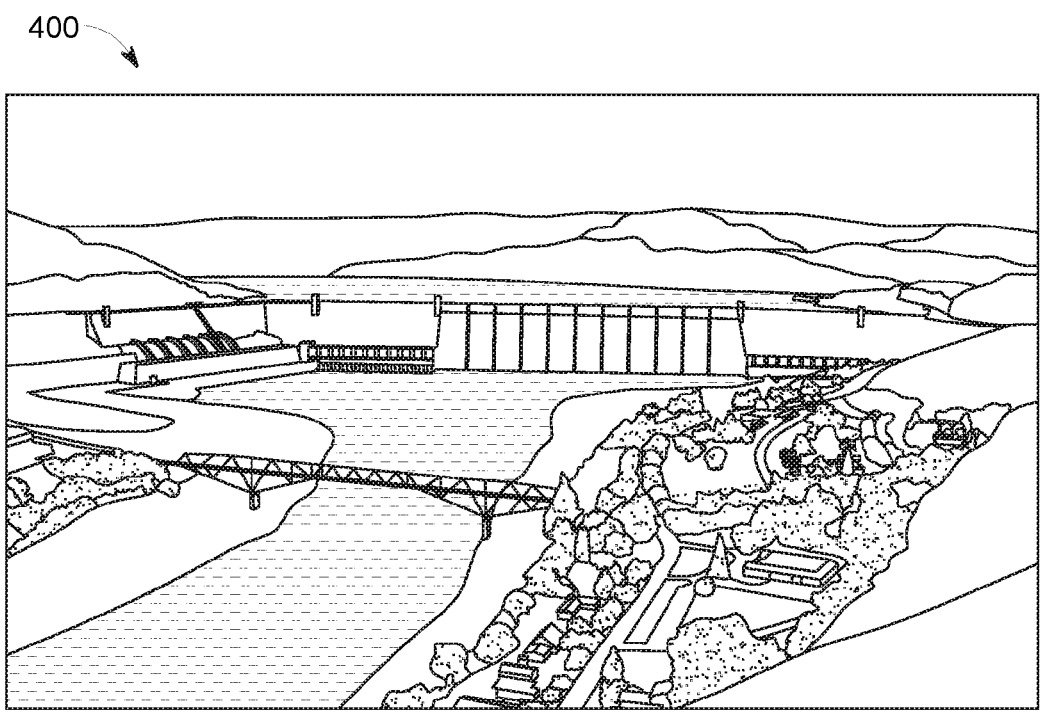
FIG. 4 illustrates another example of a powered system having a control system that uses one or more embodiments of subject matter described herein.

FIGS. 1 through 4 illustrate several examples of powered systems 100, 200, 300, 400 having control systems that use one or more embodiments of subject matter described herein. The powered system 100 shown in FIG. 1 is a locomotive, which has a control system that controls operations (e.g., movement and other actions) of the locomotive based on data obtained by, generated by, and/or communicated among devices of the locomotive and/or off-board the locomotive. The powered system 200 shown in FIG. 2 is an automobile, which has a control system 202 that controls operations (e.g., driver warnings, automated movement, or other actions) of the automobile based on data obtained by, generated by, and/or communicated among devices of the automobile and/or off-board the automobile. The powered system 300 shown in FIG. 3 is a medical device, such as a magnetic resonance imaging (MRI) device. Alternatively, the powered system 300 may represent several medical devices, such as medical equipment within a surgical suite, emergency room, hospital, or the like. The powered system 300 may include a control system 302 that controls operations of the medical equipment or devices, communicates information between or among the medical equipment or devices, etc., to allow for automated control of the equipment or devices, to provide information to operators of the equipment or devices, etc. The powered system 400 shown in FIG. 4 is a hydraulic power plant, which has a control system that controls operations of the plant based on data obtained by, generated by, and/or communicated among devices of the plant.

Figure 5:
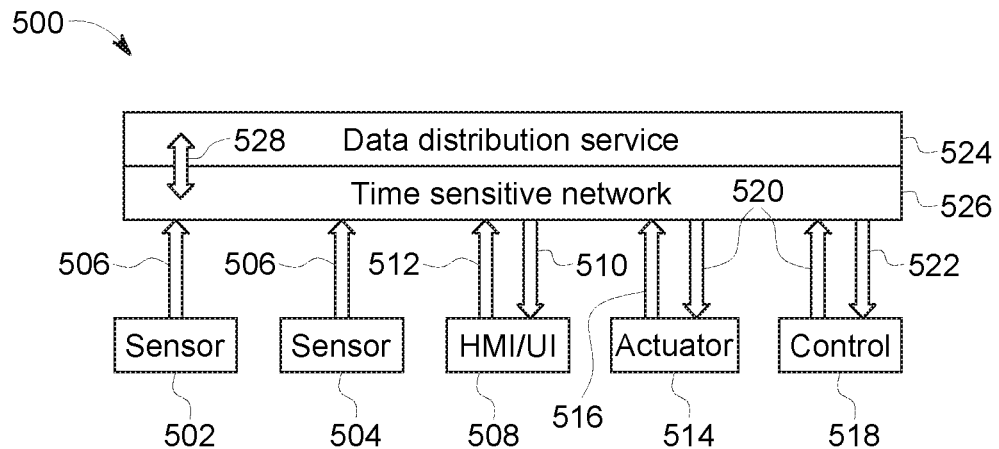
FIG. 5 illustrates one embodiment of a communication system.

FIG. 5 illustrates one embodiment of a communication system 500. The communication system 500 may be used by a control system 518 ("Control" in FIG. 5) to communicate data between or among devices of the control system 518 and/or the powered system that is controlled by the control system 518. The control system 518 may represent one or more of the control systems 100, 200, 300, 400 shown in FIGS. 1 through 4. The control system 518 shown in FIG. 5 represents hardware circuitry that includes and/or is connected with one or more processors (e.g., microprocessors, integrated circuits, field programmable gate arrays, etc.) that perform operations to control the powered system(s).

The communication system 500 communicates data between several devices, such as sensors 502, 504 that monitor, measure, record, etc. information and communicate this information as sensor data 506. Another device that can communicate via the communication system 500 can include a human machine interface (HMI) or user interface (UI) (shown as "HMI/UI" in FIG. 5) 508 that receives output or status data 510 that is to be presented to a user or operator of the communication system 500 or control system 518 and that can communicate input data 512 received from the user or operator to one or more other devices of the control system. The HMI/UI 508 can represent a display device, touchscreen, laptop, tablet computer, mobile phone, speaker, haptic device, or other device that communicates or conveys information to a user or operator.

In one embodiment, at least one of the sensors 502, 504 may be a camera that generates video or image data, an x-ray detector, an acoustic pick-up device, a tachometer, a global positioning system receiver, a wireless device that transmits a wireless signal and detects reflections of the wireless signal in order to generate image data representative of bodies or objects behind walls, sides of cars, or other opaque bodies, or another device.

Another device that can communicate using the communication system 500 includes one or more actuators 514, which represent devices, equipment, or machinery that move to perform one or more operations of the powered system that is controlled by the control system 518. Examples of actuators 514 include brakes, throttles, robotic devices, medical imaging devices, lights, turbines, etc. The actuators 514 can communicate status data 516 of the actuators 514 to one or more other devices in the powered system via the communication system 500. The status data 516 represent a position, state, health, or the like, of the actuator 514 sending the status data 516. The actuators 514 can receive command data 520 from one or more other devices of the powered system or control system via the communication system 500. The command data 520 represents instructions that direct the actuators 514 how and/or when to move, operate, etc.

The control system 518 can communicate (e.g., receive, transmit, and/or broadcast) a variety of data between or among the devices via the communication system 500. For example, the control system 518 can communicate the command data 520 to one or more of the devices and/or receive data 522, such as status data 516 and/or sensor data 506, from one or more of the devices. While devices are shown in FIG. 5 as sending certain data or receiving certain data, optionally, the devices may send and/or receive other types of data. For example, the sensors 502, 504 may receive data and/or send other types of data.

The communication system 500 communicates data between or among the devices and/or control system 518 using a communication network 526 that communicates data using a data distribution service (DDS) 524. The network 526 is shown in FIG. 5 as a time sensitive network, but alternatively may be another type of network. The data distribution service 524 represents an object management group (OMG) device-to-device middleware communication standard between the devices and the network. The data distribution service 524 allows for communication between publishers and subscribers. The term publisher refers to devices 502, 504, 508, 514, 518 that send data to other devices 502, 504, 508, 514, 518 and the term subscriber refers to devices 502, 504, 508, 514, 518 that receive data from other devices 502, 504, 508, 514, 518. The data distribution service 524 is network agnostic in that the data distribution service 524 can operate on a variety of networks, such as Ethernet networks as one example. The data distribution service 524 operates between the network through which data is communicated and the applications communicating the data (e.g., the devices 502, 504, 508, 514, 518). The devices 502, 504, 508, 514, 518 can publish and subscribe to data over a distributed area to permit a wide variety of information to be shared among the devices 502, 504, 508, 514, 518.

In one embodiment, the data distribution service 524 is used by the devices 502, 504, 508, 514, 518 to communicate data 506, 510, 512, 516, 520, 522 through the network 526, which may operate on an Ethernet network of the powered system. The network 526 may be at least partially defined by a set of standards developed by the Time-Sensitive Networking Task Group, and includes one or more of the IEEE 802.1 standards. While an Ethernet network may operate without TSN, such a network may communicate data frames or packets in a random or pseudo-random manner that does not ensure that the data is communicated within designated time periods or at designated times. As a result, some data may not reach devices connected via the non-TSN Ethernet network in sufficient time for the devices to operate using the data. With respect to some control systems, the late arrival of data can have disastrous consequences, as described above. A TSN-based Ethernet network, however, can dictate when certain data communications occur to ensure that certain data frames or packets are communicated within designated time periods or at designated times. Data transmissions within a TSN-based Ethernet network can be based on a global time or time scale of the network that is the same for the devices in or connected with the network, with the times or time slots in which the devices communicate being scheduled for at least some of the devices.

The communication system 500 may use the network 526 to communicate data between or among the devices 502, 504, 508, 514, 518 using the data distribution service 524 in order to maintain QoS parameters 528 of communications to and/or from certain devices 502, 504, 508, 514, 518. The QoS parameters 528 represent how quickly and/or efficiently data communication between or among the devices 502, 504, 508, 514, 518 are occurring. The QoS parameters 528 may represent data throughput, or a rate at which data of the communications moves through the network 526, a percentage or fraction of communications that occur no later than a designated time or within a designated time period, etc. The QoS parameters 528 are determined for the data distribution service 524 and mapped (e.g., applied, or used to dictate how and/or when data is communicated, as described herein) to the network 526 in one embodiment. A QoS parameter 528 can be used to ensure that data communicated with one or more devices 502, 504, 508, 514, 518, to one or more devices 502, 504, 508, 514, 518, and/or between two or more devices 502, 504, 508, 514, 518 is received in a timely manner (e.g., at designated times or within designated time periods).

The devices 502, 504, 508, 514, 518 can communicate the data (e.g., publish and/or subscribe to the data) according to the schedules dictated by the control system 518 in order to achieve or maintain the QoS parameters 528 of the devices 502, 504, 508, 514, 518 at or above designated threshold limits. Other data and/or other devices may communicate with or among each other using the same network, but without a designated schedule and/or without being subject to QoS parameters 528. For example, the sensor 502, actuator 514, and control system 518 may have QoS parameters 528 and the control system 518 can dictate schedules for when the sensor 502, actuator 514, and control system 518 publish and/or receive data via the network 526. A schedule for the network 526 may designate or dictate when certain communications (e.g., communications between designated devices) are to begin, a deadline or time when these certain communications are to be completed for a communication cycle, a time period within which these certain communications are to be completed for the communication cycle, the node devices within the network 526 through which these certain communications are to be routed through, the amount of bandwidth that can be used for these certain communications, or the like.

The network 526 can be an Ethernet based network that communicates different categories or groups or types of data according to different priorities. For example, the network 526 can communicate time sensitive data according to the schedule or schedules determined by a scheduler (described herein) in order to achieve or maintain the QoS parameters 528 of certain devices 502, 504, 508, 514, 518. The network 526 can communicate other data between or among the same or other devices 502, 504, 508, 514, 518 as "best effort" traffic or rate constrained traffic. Best effort traffic includes the communication of data between or among at least some of the devices 502, 504, 508, 514, 518 that is not subject to or required to meet the QoS parameters 528 of the devices 502, 504, 508, 514, 518. This data may be communicated at a higher priority than the data communicated in rate constrained traffic, but at a lower priority than the data communicated according to the schedules dictated by the control system 518 in order to meet or achieve the QoS parameters 528 (also referred to herein as time sensitive traffic). The rate constrained traffic can include data that is communicated between or among the devices 502, 504, 508, 514, 518, but that is communicated at a lower priority than the time sensitive data and the best effort traffic. The time sensitive data, the best effort traffic, and the rate constrained traffic are communicated within or through the same network 526, but with different priorities. The time sensitive data is communicated at designated times or within designated time periods, while the best effort traffic and rate constrained traffic is attempted to be communicated in a timely manner, but that may be delayed in order to ensure that the time sensitive data is communicated to achieve or maintain the QoS parameters 528.

Figure 6:
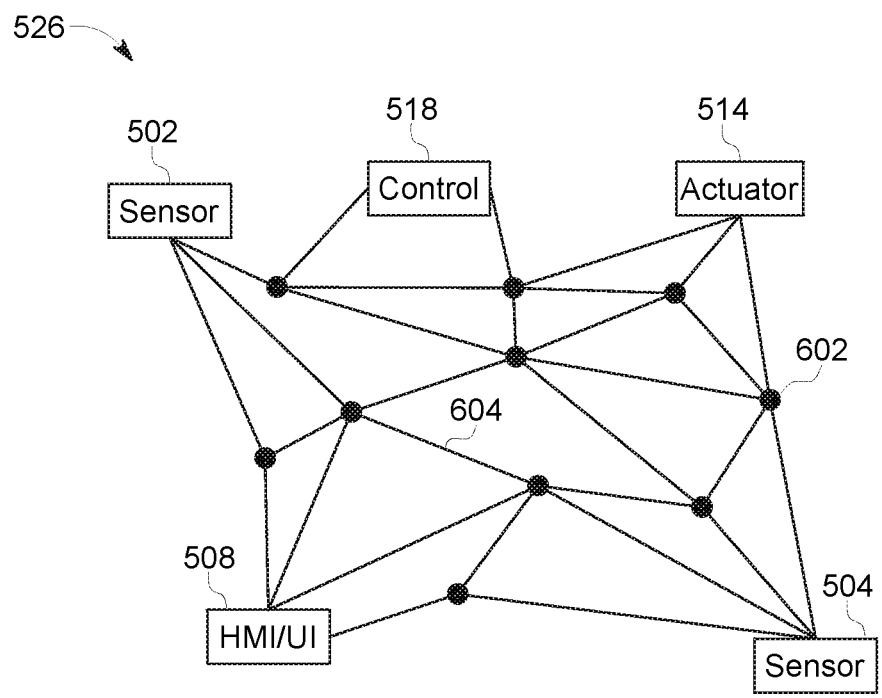
FIG. 6 schematically illustrates a communication network through which devices of the communication system may communicate data using a data distribution service shown in FIG. 5.

FIG. 6 schematically illustrates one embodiment of the communication network 526 shown in FIG. 5 through which the devices 502, 504, 508, 514, 518 may communicate the data 506, 510, 512, 516, 520, 522 using the data distribution service 524. The network 526 may be configured to operate as a TSN. The network 526 includes the devices 502, 504, 508, 514, 518 communicatively coupled with each other by communication links 604 and node devices 602. The communication links 604 may be referred to as virtual links, and may represent wired and/or wireless connections over or through which data packets, frames, and/or datagrams may be communicated between the connected node devices 602.

The node devices 602 can include routers, switches, repeaters, or other devices capable of receiving data frames or packets and sending the data frames or packets to another node device 602. In one embodiment, the devices 502, 504, 508, 514, 518 also can be node devices 602 in the network 526. The communication links 604 represent wired connections between the node devices 602, such as wires, buses, cables, or other conductive pathways between the node devices 602. Optionally, one or more of the communication links 604 includes a wireless connection or network between node devices 602.

The data 506, 510, 512, 516, 520, 522 (shown in FIG. 5) can be communicated in the network 526 as data frames or data packets. The data frames or packets can be published by a device 502, 504, 508, 514, 518 and received by another device 502, 504, 508, 514, 518 by the frames or packets hopping, or moving from node device 602 to node device 602 along the links 604 within the network 526 according to a network or communication schedule. For example, one or more of the data frames or packets of the data 506 published by the sensor 504 can be sent to the network 526 and subscribed to by the control system 518. The data frames or packets may hop from the sensor 504 to the control system 518 by being communicated from the sensor 504 to the one node device 602, then to another node device 602, then to another node device 602, and then the control system 518. Different frames or packets may be communicated along different node devices 602 and paths 604 from the publishing device to the subscribing device.

Figure 7:
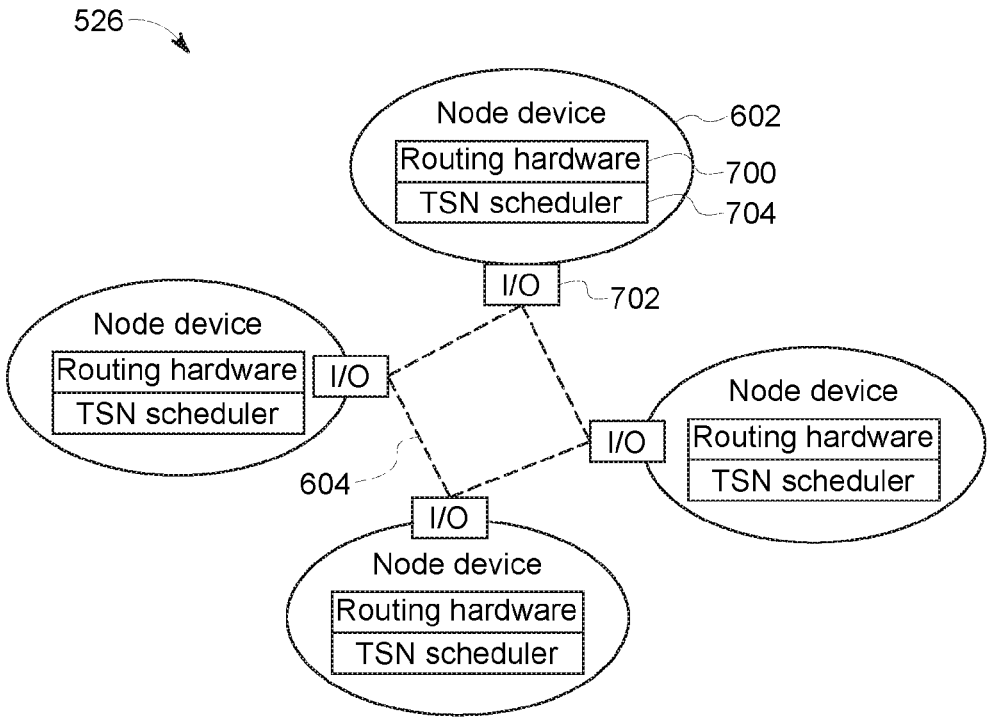
FIG. 7 illustrates several node devices communicatively coupled with each other in the network shown in FIG. 5 according to one embodiment.

FIG. 7 illustrates several node devices 602 communicatively coupled with each other in the network 526 according to one embodiment. The node devices 602 are communicatively coupled with each other by the communication links 604, as described above. The node devices 602 include routing hardware 700 that are the forwarding planes of the node devices 602. The hardware 700 includes circuitry connected with network interfaces 702 ("I/O" in FIG. 7) to allow for the communication of data packets through the routing hardware 904. The network interfaces 702 can represent ports, connectors, antennas, or other circuitry that allow for the node devices 602 to be communicatively coupled with the communication links 604. The routing hardware 700 includes circuitry that receives incoming data packets, frames, or datagrams, via the network interfaces 702, determines where to send the incoming data packets, frames, or datagrams (e.g., based on a routing table stored in an internal memory of the hardware 700), determines when to send the incoming data packets, frames, or datagrams (e.g., based on a routing schedule stored in the internal memory of the hardware 700), and sends the data packets, frames, or datagrams to another node device 602 or a final destination of the data packets, frames, or datagrams via the network interface 702 and a corresponding communication link 604.

Some or all of the node devices 602 participating in the communication of data within the network 526 may include a scheduling controller 704 ("TSN Scheduler" in FIG. 7). The scheduling controller 704 represents hardware circuitry that includes and/or is connected with one or more processors (e.g., microprocessors, integrated circuits, and/or field programmable gate arrays) that determine communication schedules for when (and, optionally, where) communications through the respective node device 602 are to occur. For example, the scheduling controller 704 of a node device 602 can determine when data packets, frames, or datagrams of various different communications are to be forwarded from the node device 602 to another node device 602 or a final destination of the data packet, frame, or datagram. The different communications can represent communications between different devices 502, 504, 508, 514, 518 (shown in FIG. 5) of the DDS 524 or other system.

For example, a first communication from the sensor 502 to the control system 518 may be scheduled to be completed before a first designated time within a communication cycle (e.g., with each communication cycle lasting a designated time period, such as 100 milliseconds), a second communication from the sensor 502 to the HMI/UI 508 may be scheduled to be completed before a subsequent, second designated time within the same communication cycle, and so on. The routing hardware 700 can send the data packets, frames, or datagrams for the first communication through or over a communication link 604 to the appropriate next node device 602 along the network path at a time that allows the data packets, frames, or datagrams for the first communication to reach the final destination before the first designated time. The routing hardware 700 can delay sending the data packets, frames, or datagrams for other communications (e.g., the second communication) through or over a communication link 604 to the appropriate next node device 602 along the network path at a subsequent time that allows the data packets, frames, or datagrams for the other communications to reach the final destination according to the communication schedules for the other communications.

The scheduling controllers 704 of the node devices 602 can communicate with each other and optionally with the control system 518 to determine the communication schedules for the various node devices 602. The control system 518 can communicate with the scheduling controllers 704 (e.g., via the communication links 604) to inform the scheduling controllers 704 of when communications between various pairs or groups of devices 502, 504, 508, 514, 518 (and/or additional devices) are to occur for time sensitive communications. The control system 518 optionally may inform the scheduling controllers 704 of which communications between various pairs or groups of devices 502, 504, 508, 514, 518 (and/or additional devices) are non-time sensitive communications, such as rate constrained communications and/or best effort communications.

The scheduling controllers 704 may communicate with each other to determine when and where to communicate the data packets, frames, and/or datagrams of these communications in order to ensure that the time sensitive communications occur or are completed prior to the scheduled times. The scheduling controllers 704 may communicate with each other to determine when and where to communicate the data packets, frames, and/or datagrams of the non-time sensitive communications to ensure that the non-time sensitive communications are completed, but do not prevent or interfere with the time sensitive communications.

For example, the scheduling controllers 704 may determine communication loads representative of the amount of data being communicated through the corresponding node devices 602 at different times, which node devices 602 are directly linked with each other, which node devices 602 are directly linked with one or more of the devices 502, 504, 508, 514, 518, etc. This information can be shared between the scheduling controllers 704 as each scheduling controller 704 may be aware of the communication links 604 between the node device 602 of the scheduling controller 704 and other node devices 602. This information may be programmed into the memory of the scheduling controllers 704 and/or may be provided by the control system 518.

Based on the communication loads and the communication links 604 between the node devices 602, the scheduling controllers 704 may communicate with each other to coordinate cooperative schedules among the node devices 602. The scheduling controllers 704 may generate communication schedules to ensure that time sensitive communications occur through the communication links 604 and node devices 602 before the scheduled times dictated by the control system 518, while avoiding sending too many data packets, frames, and/or datagrams through the same node device 602 (and potentially slowing down communication to miss the scheduled communication time). For the remaining non-time sensitive communications, the scheduling controllers 704 may generate communication schedules to ensure that the non-time sensitive communications occur through the communication links 604 and node devices 602 while avoiding sending too many data packets, frames, and/or datagrams through the same node device 602 (and potentially slowing down communication to prevent communication).

Each scheduling controller 704 may generate a communication schedule for the node device 602 of that scheduling controller 704. The scheduling controllers 704 may share the schedule with other devices having an application with a competing link (e.g., an overlapping route through the network). The scheduling controllers 704 may modify the schedules in order to ensure that the node devices 602 do not become too congested to prevent time sensitive communications from being completed within scheduled times and/or to prevent unnecessary delays in the non-time sensitive communications. The scheduling controllers 704 can modify the schedules responsive to more than a designated communication load (e.g., data rate) of data being sent through the same node device 602. The scheduling controllers 704 can modify the schedules by changing the path for one or more communications (e.g., which node devices 602 communicate the data of the communications) and/or the times at which the communications occur through the various node devices 602. The scheduling controllers 704 can periodically or irregularly modify the communication schedules of one or more of the node devices 602. If there are no overlapping routes or competing links, however, the scheduling controllers 704 can independently create the schedules for the node devices 602. Optionally, one or more of the scheduling controllers 704 can create schedules with holes in the schedules, such as node devices 602 that are not used in the schedules or are not used during designated time periods. This can allow for other scheduling controllers 704 to create or modify other schedules that use these node devices 602.

Distributing the generation of the communication schedules among the node devices 602 can eliminate a shutdown of the network 526 caused by failure of a single scheduling device or controller that generates the communication schedules for the node devices 602. This scheduling distribution also eliminates the time-consuming process of sending relatively large amounts of information to a single, off-line scheduling device or controller, waiting for the single, off-line scheduling device or controller to generate many schedules for the many node devices 602, and then sending the schedules to the various node devices.

Alternatively, the communication system 526 may have a scheduling controller that is outside of the node devices 602. This scheduling controller may generate the schedules for the node devices 602 based on the communication loads and the communication links 604 between the node devices 602, the identification of time sensitive or non-time sensitive communications by the control system 518, and the designated times or time periods in which the time sensitive communications are required to be completed as designated by the control system 518. The scheduling controller may then communicate the schedules to the node devices 602 for use in controlling when and where data packets, frames, and/or datagrams are communicated. This type of scheduling controller may be referred to as a centralized or non-distributed scheduling controller.

In one embodiment, one or more of the scheduling controllers may use network calculus as an aid to determining the communication schedules for one or more, or all, of the node devices 602 participating in communication of data packets, frames, and/or datagrams in the DDS 524 using the TSN 526. Use of network calculus can provide a faster analytical approximation to generating communication schedules relative to other scheduling approaches. This can assist in steering the scheduling controller(s) toward the communication schedules and/or provide a relatively quick, first-order result for the communication schedules in time-critical situations (relative to using another approach).

The scheduling controller(s) may determine the communication schedules of the node devices by making a first order approximation of the bandwidth of the network 526 that is consumed by the communications identified by the control system 518 (and/or other devices using the DDS 524). This first order approximation may include estimated or designated amounts of data (e.g., in terms of bits or other units) and/or bandwidth (e.g., data rate) that are expected to be used by communicating various communications between and/or among the devices 502, 504, 508, 514, 518. The estimated amounts of data and/or bandwidth may be based on a source of the data. For example, the sensor 502 may be associated with larger amounts of data for each communication from the sensor 502 than the sensor 504, while communications from the HMI/UI 508 may be associated with larger amounts of data for each communication from the HMI/UI 508.

Additionally or alternatively, the estimated amounts of data and/or bandwidth for a communication may be based on a temporal or priority category of the communication. Time sensitive communications may be associated with larger estimated amounts of data than rate constrained communications, which may be associated with larger estimated amounts of data than best effort communications. In one embodiment, the estimated amounts of data and/or bandwidth are based on previous communications of the same or similar data by the same or similar devices 502, 504, 508, 514, 518.

The first order approximation may be a conservative estimation of the amounts of data and/or bandwidth used in the communications. For example, the estimate may be a 10%, 20%, or other increase over the size of data communicated in a previous communication of data.

The scheduling controller(s) may eliminate some communications (e.g., times and/or paths of the communications) from consideration as being included in a communications schedule based on the estimated amounts of data and/or bandwidth. For example, the estimated data amounts and/or bandwidths may result in too much data or bandwidth (e.g., an amount of data and/or a bandwidth that exceeds a designated threshold) traveling through one or more of the node devices 602. The scheduling controller(s) may eliminate these communications from consideration in being used to generate a communication schedule. The scheduling controller(s) may use the other communications that were not eliminated from consideration to form the communication schedule of the network 526. For example, the remaining communications resulting from elimination of the communications having too large of an amount of data passing through one or more nodes 602 and/or consuming too large of an amount of bandwidth through the one or more nodes 602 may be eliminated from consideration for including in a schedule. The scheduling controller(s) may then generate the communication schedule for the network 526 using some or all of the remaining communications.

Optionally, the scheduling controller(s) may use changeable paths through the network 526 to generate the communication schedule. For example, the scheduling controller(s) may use tensors to represent the amount of data traveling through various node devices 602 using different communication paths between the devices 502, 504, 508, 514, 518 and through different combinations of the node devices 602.

The tensors may be matrices representative of the data traffic (e.g., the amount of data traveling through each node device 602) with different pathways for the data being used.

Figure 8:
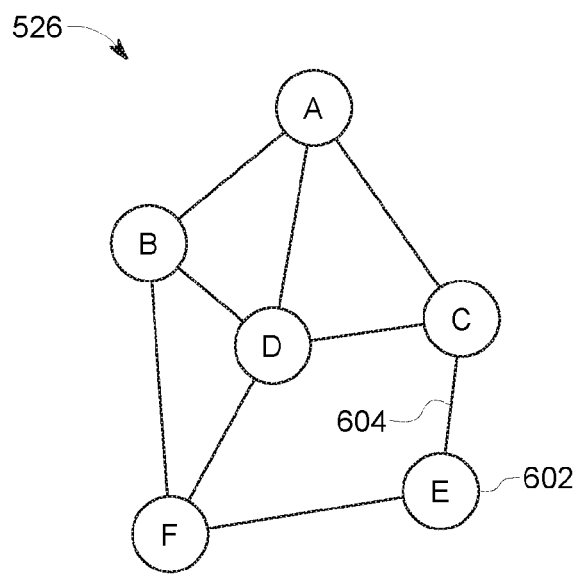
FIG. 8 illustrates one portion of the network shown in FIG. 5 and several node devices shown in FIG. 6 within the network according to one example.

FIG. 8 illustrates one portion of the network 526 and several node devices 602 within the network 526 according to one example. The node devices 602 in FIG. 8 are marked A-F to indicate different node devices 602. Several communication paths extend from the A node device 602 to the F node device 602. These communication paths include the following paths, listed by letter representing the node devices 602 in the order of hops of data packets, frames, or datagrams along the paths: ABF, ABDF, ABDCEF, ADF, ADBF, ADCEF, ACEF, ACDF, and ACDBF. Tensors may be determined for the data traffic (e.g., the amount of data) flowing through each of the node device 602 for each of these paths. The tensors for a node device 602 may be matrices having columns and rows representative of different paths through that node device 602. For example, because there are six node devices 602 shown in FIG. 8, there may be six rows and six columns for the tensors representative of different data traffic through at least some of the node devices 602. The values at each intersection of the columns and rows may represent the traffic flow through the node device 602 represented by that intersection. Based on these values, it can be determined, from the matrices, which paths may have lower data traffic than other paths.

For example, the tensor for various paths through the node devices 602 shown in FIG. 8 may be represented as:

|  | Dev A | Dev B | Dev C | Dev D | Dev E | Dev F |
|---|---|---|---|---|---|---|
| Device A | 0 | A→B | A→C | A→D | 0 | 0 |
| Device B | B→A | 0 | B→C | B→D | 0 | B→F |
| Device C | C→A | 0 | 0 | C→D | C→E | 0 |
| Device D | D→A | D→B | D→C | 0 | 0 | D→F |
| Device E | 0 | 0 | E→C | 0 | 0 | E→F |
| Device F | 0 | F→B | 0 | F→D | F→E | 0 | with the values of each entry in the matrix indicative of the data traffic flowing through the node devices 602 along the direction indicated. For example, the value of the second row and third column in the matrix (e.g., the value of B→C) can indicate the data traffic flowing through the C node device 602 from the B node device 602. Additional tensors may be determined based on other directions of data traffic flow.

Many tensors may be determined for different groups of node devices 602 in the network 526. The values of the tensors may be examined to determine which communication paths are least congested (e.g., relative to one or more, or all, other paths) and/or which communication paths avoid too much data being communicated through the same node device 602 (e.g., more than a designated threshold amount of data).

The scheduling controller(s) can determine the tensors for the various groups of node devices 602 based on the communications that are scheduled to occur between different devices 502, 504, 508, 514, 518 and the groups of node devices 602 that connect the different pairs or groups of devices 502, 504, 508, 514, 518 that are communicating with each other. For example, if the sensor 504 is scheduled to publish sensor data and the HMI/UI 508 and the actuator 514 are to read the published sensor data, then tensors may be created for some or all potential paths extending through the node devices 602 from the sensor 504 to the HMI/UI 508 and from the sensor 504 to the actuator 514. The values in the tensors may be examined to determine which paths avoid data traffic congestion at one or more node devices 602. For example, the scheduling controller(s) can select one or more communication paths for the sensor 504 to publish sensor data to the HMI/UI 508 and the actuator 514 that has no more than a threshold amount of data communicated through one or more of the node devices 602. The communication path that is used for publication of data from one device 502, 504, 508, 514, 518 and the reading of the data by another device 502, 504, 508, 514, 518 can be dynamically altered without shutting down or restarting the network 526 in order to avoid sending too much data through the same node devices 602.

In one embodiment, one or more of the scheduling controller(s) can change or establish the communication schedules for one or more of the nodes to establish non-overlapping communication timings within a communication cycle. This can reduce the data traffic congestion or the amount of data traffic handled by one or more node devices 602 and thereby increase the QoS parameter 528 communications between two or more of the devices 502, 504, 508, 514, 518.

Figure 9:
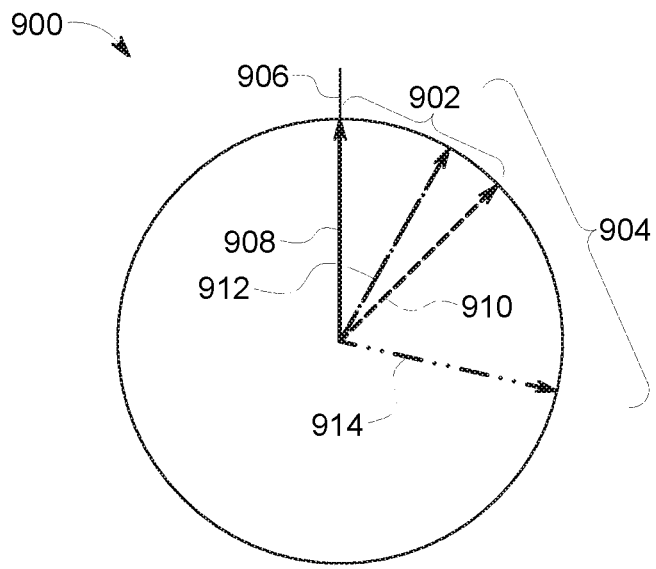
FIG. 9 illustrates a timing diagram for overlapping data communications during a single communication cycle of a node device shown in FIG. 6 according to one example.

FIG. 9 illustrates a timing diagram 900 for overlapping data communications 902, 904 during a single communication cycle of a node device 602 shown in FIG. 6 according to one example. The timing diagram 900 includes a circle representative of a single communication cycle for the node device 602. For example, a marker 906 indicates the start of a communication cycle for the node device 602, with time progressing during the communication cycle in a clock-wise manner to return to the marker 906. The data communication 902 extends from a first time marker 908 to a subsequent, second time marker 910 and occurs over a time period extending from the first time marker 908 to the second time marker 910. This indicates that the data packets, frames, and/or datagrams for a communication between two or more of the devices 502, 504, 508, 514, 518 are received into and communicated out of the node device 602 starting at the time in the communication cycle indicated by the first time marker 908 and ending at the second time marker 910.

The data communication 904 extends from a third time marker 912 to a subsequent, fourth time marker 914 and occurs over a time period extending from the third time marker 912 to the fourth time marker 914. This indicates that the data packets, frames, and/or datagrams for the same or different communication between two or more of the devices 502, 504, 508, 514, 518 (e.g., the same or different communication as the time markers 908, 910) are received into and communicated out of the node device 602 starting at the time in the communication cycle indicated by the third time marker 912 and ending at the fourth time marker 914.

The data communications 902, 904 through the node device 602 overlap in time. For example, during a time period extending from the third time marker 912 to the second time marker 910, the data of the first communication and the data of the second communication are being concurrently communicated through the same node device 602. This can indicate congestion in the node device 602 that can increase the latency of the first and second communications and thereby reduce the QoS parameters 528 of both the first and second data communications.

Figure 10:
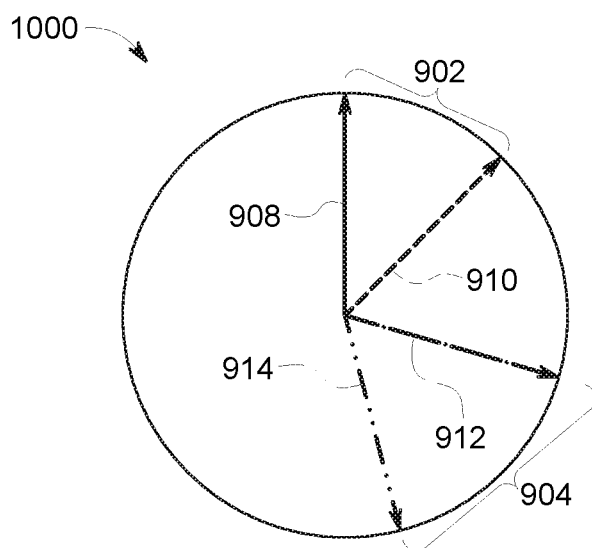
FIG. 10 illustrates another timing diagram for non-overlapping data communications during the single communication cycle of a node device shown in FIG. 6 according to one example.

In order to reduce the congestion within the node device 602 and increase the QoS parameters 528 of the first and second data communications, the scheduling controller(s) can change the schedule of the first or second communications. FIG. 10 illustrates another timing diagram 1000 for non-overlapping data communications 902, 904 during the single communication cycle of a node device 602 shown in FIG. 6 according to one example. Similar to the timing diagram 900 shown in FIG. 9, the first data communication 902 extends from the first time marker 908 to the second time marker 910 and the second data communication 904 extends from the third time marker 912 to the fourth time marker 914.

The data communications 902, 904 through the node device 602 overlap in time. For example, during a time period extending from the third time marker 912 to the second time marker 910, the data of the first communication and the data of the second communication are being concurrently communicated through the same node device 602. This can indicate congestion in the node device 602 that can increase the latency of the first and second communications and thereby reduce the QoS parameters 528 of both the first and second data communications 902, 904.

In order to reduce the congestion within the node device 602 and increase the QoS parameters 528 of the first and second data communications, the scheduling controller(s) can change the schedule of the first and/or second communications 902, 904. For example, the scheduling controller(s) can delay the start (e.g., the third time marker 912) of the second communication 904 until after the end (e.g., the second time marker 910) of the first communication 902. This prevents the first and second communications 902, 904 from overlapping, as shown in FIG. 10. This can reduce congestion in the node device 602 (relative to overlapping communications) that can decrease the latency of the first and second communications 902, 904 and thereby increase the QoS parameters 528 of the first and/or second data communications 902, 904 (e.g., relative to overlapping communications). Additionally, the time period between the communications 902, 904 can allow for one or more additional communications through the node device 602 to occur.

Delaying some data communications through one or more node devices 602 can increase the QoS parameter 528 of some communications, but can decrease the QoS parameter 528 of other data communications. For example, delaying the start of the second communication 904 in the timing diagram 1000 shown in FIG. 10 may increase the QoS parameter 528 of the first data communication 902, but may decrease the QoS parameter 528 of the second data communication 904. The scheduling controller(s) can determine which communications to delay or change the timing of in order to reduce latency and increase (or not decrease) the QoS parameters 528 of one or more communications based on tolerances associated with the QoS parameters 528.

A tolerance associated with a QoS parameter 528 is an allowance for a communication to not meet the requirement of limit or threshold for a QoS parameter 528. For example, some QoS parameters 528, such as a rate or amount of data in a communication, may have lower thresholds or limits to ensure timely delivery of the data to a device 502, 504, 508, 514, 518. A tolerance allows for the QoS parameter 528 to not meet the limit or threshold, but still be acceptable (e.g., and not result in the scheduling controller(s) revising the schedule(s)). The tolerances for different QoS limits or thresholds may be varied by an operator of the communication system.

The scheduling controller(s) may select which communications to vary and/or which device nodes 602 to change (e.g., delay) the communications based on the QoS tolerances. With respect to the examples of FIGS. 9 and 10, the first data communication 902 may have a smaller or no QoS tolerance, while the second data communication 904 may have a larger QoS tolerance. As a result, the scheduling controller(s) delay the second communication 904 in the communication cycle, and not the first communication 902. The delay in the second communication 904 can result in the second communication 904 not meeting the QoS limit or threshold, but still fall within the tolerance associated with the QoS parameter, while the QoS parameter of the first communication meets or exceeds the associated limit or threshold.

Figure 11:
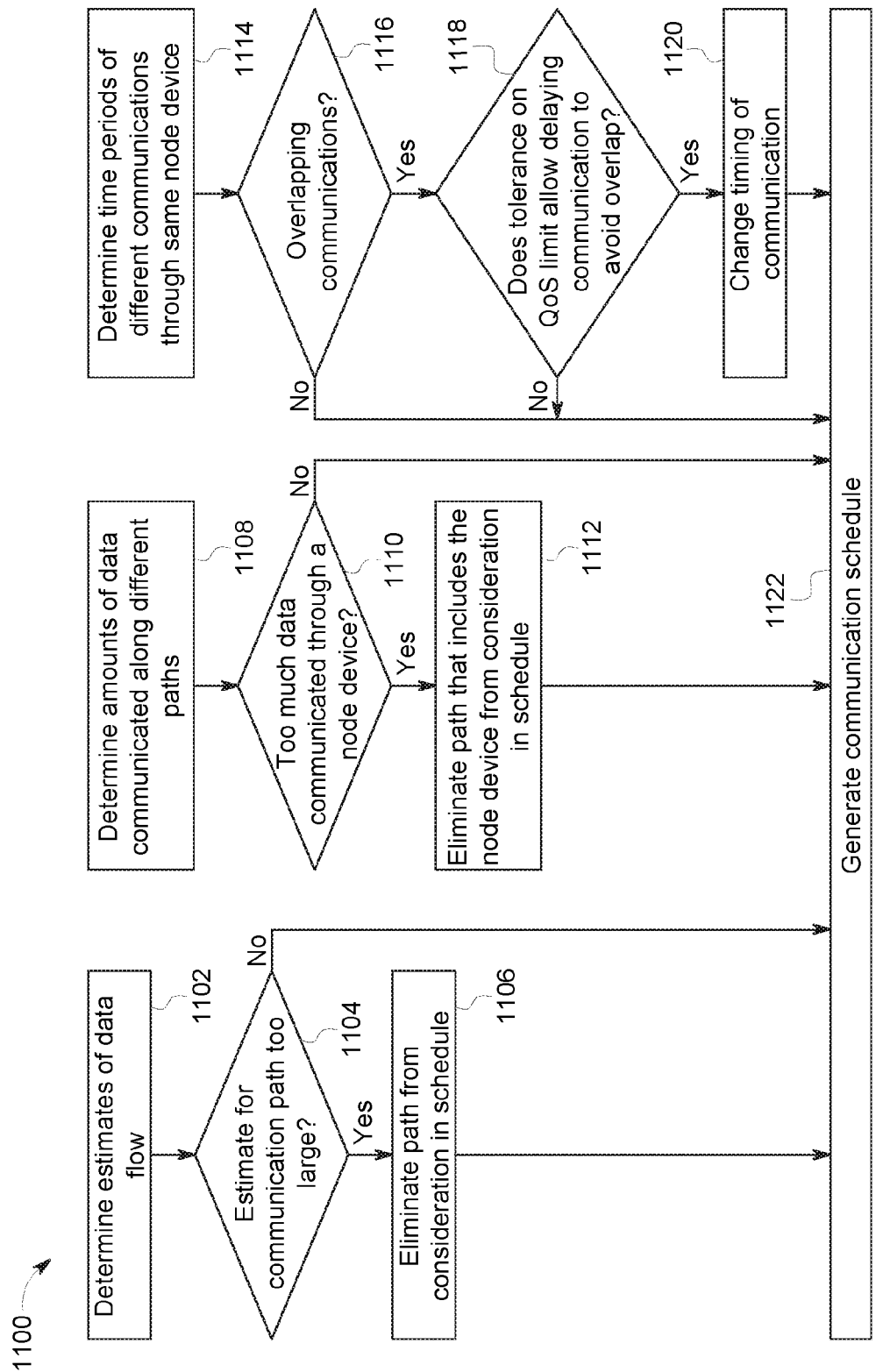
FIG. 11 illustrates a flowchart of one embodiment of a method for scheduling communications within a time sensitive network.

FIG. 11 illustrates a flowchart of one embodiment of a method 1100 for scheduling communications within a time sensitive network. The method 1100 may be performed by one or more embodiments of the scheduling controllers described herein. The method 1100 can represent the operations performed by software running on the scheduling controllers, or can be used to create such software. While the method 1100 relates to scheduling communications in a time sensitive network, in one embodiment, the method 1100 can be used to schedule communications in another type of network.

At 1102, estimates of data moving through the node devices in the network are determined. For example, one or more of the scheduling controllers may use network calculus make a first order approximation of the bandwidth of the network that is consumed by the communications to occur within the network. The first order approximation may include estimated or designated amounts of data and/or bandwidth that are expected to be used by communicating various communications between and/or among the devices 502, 504, 508, 514, 518. The estimated amounts of data and/or bandwidth may be based on a source of the data and/or previous communications by the devices 502, 504, 508, 514, 518.

At 1104, a determination is made as to whether the estimated amount of data and/or bandwidth is too large. For example, some node devices may have upper limits or thresholds on the amount of data or bandwidth that can be communicated through the node devices. If the estimated amount of data and/or bandwidth is too large for a node device along a communication path, then flow of the method 1100 may proceed toward 1106. Otherwise, flow of the method 1100 can proceed toward 1122.

At 1106, the communication paths having the node device(s) for which the estimated amount of data and/or bandwidth is too large are eliminated from consideration. These paths may be eliminated from being considered for inclusion in a communication schedule for the network.

Concurrently or simultaneously with the operations performed at 1102 through 1106, the method 1100 optionally can include (at 1108) determining the amounts of data communicated along different paths in the network. The amounts of data communicated (or planned for communication) along the different paths can be represented by tensors, as described above.

At 1110, the amounts of data communicated along the different paths are examined in order to determine if the amount of data communicated along one or more of the paths in the network is too large. For example, the tensors can be examined to determine if any values within the tensors exceed thresholds or limits for the amount of data that can be communicated through node devices along one or more of the paths. If the amount of data communicated, planned, or requested for communication through a path is too large (e.g., exceeds an upper threshold or limit), then flow of the method 1100 can proceed toward 1112. Otherwise, flow of the method 1100 can proceed toward 1122.

Concurrently or simultaneously with the operations performed at 1102 through 1110, the method 1100 optionally can include (at 1114) determining the time periods over which different communications occur (or are scheduled to occur) through the same node device in the network. As described above, this can involve determining the portions of a communication cycle over which different communications (e.g., different data packets, frames, datagrams, or groups thereof originating from different devices and/or addressed to different devices) occur.

At 1116, a determination is made as to whether two or more different communications overlap during the same communication cycle in the same node device. As described above, this can involve determining whether one communication begins prior to completion of another communication at the same node device. If different communications occur through the same node device during overlapping time periods, then flow of the method 1100 may proceed toward 1118. Otherwise, flow of the method 1100 may proceed toward 1122.

At 1118, a determination is made as to whether a limit on a QoS parameter of one or more of the overlapping communications through the same node device allows for one or more of the communications to be delayed during the communication cycle. As described above, the limit on the QoS parameter for one of the communications may have a tolerance that allows the QoS parameter to be decreased below the limit. This can permit the communication to be delayed within the communication cycle to avoid overlapping different communications through the same node device. If one or more of the communications can be delayed, then flow of the method 1100 can proceed toward 1120. Otherwise, flow of the method 1100 can proceed toward 1122.

At 1120, the timing of at least one of the communications through the same node device is changed to avoid or decrease the amount of overlapping communications. For example, at least one of the communications may be delayed so as not to overlap another communication in the same communication cycle.

At 1122, a communication schedule is created for the network. The schedule may be created using the communication paths that did not involve estimated data traffic that was too large (e.g., as determined at 1104 and eliminated at 1106), using paths that avoid overloading node devices with too much data traffic (e.g., as determined at 1110 and eliminated at 1112), and/or using non-overlapping communication times within the same node devices (e.g., as determined at 1116 and/or changed at 1120).

In one embodiment, a node device includes routing circuitry configured to receive data from one or more other node devices within a communication network and to send the data to at least one other node device or a final destination device and a scheduling controller configured to generate schedules for sending the data through the routing circuitry within the communication network. The scheduling controller communicates with one or more other scheduling controllers in the one or more other node devices in generate the schedules for sending the data through the communication network.

In one example, the scheduling controller is configured to communicate with the one or more other scheduling controllers in the one or more other node devices in order to coordinate the schedules of the node device and the one or more other node devices with each other.

In one example, the communication network is configured to operate as a time sensitive network. The scheduling controller can be configured to generate the schedules for communication of the data between one or more writer devices and one or more reader devices of a data distribution service through the time sensitive network.

In one example, the scheduling controller is configured to generate the schedules for communication of the data using tensors representative of data traffic through one or more of the routing circuitry or the one or more other node devices.

In one example, the scheduling controller is configured to generate the schedules for communication of the data by estimating one or more of an amount of data communicated through the routing circuitry or a bandwidth consumed by the amount of data communicated through the routing circuitry and avoiding communicating the data through the routing circuitry responsive to the one or more of the amount of data or the bandwidth consumed exceeding a designated upper limit.

In one example, the scheduling controller is configured to generate the schedules by determining whether different communications of data through the routing circuitry will overlap in time during a communication cycle and generating the schedules to avoid the overlap in time of the different communications of data through the routing circuitry.

In one example, the scheduling controller is configured to generate the schedules to avoid the overlap in time responsive to a quality of service parameter of at least one of the different communications of data decreasing below a lower limit but remaining above a tolerance associated with the lower limit.

In one embodiment, a method includes determining (at one or more scheduling controllers in a time sensitive network) one or more of estimates of data to be routed through different communication paths in the time sensitive network, amounts of the data to be communicated through different node devices of the time sensitive network, and/or time periods in which different communications of the data occur during a communication cycle of the same node device of the time sensitive network. The method also includes generating (at the one or more scheduling controllers in the time sensitive network) schedules for sending the data through the different node devices based on one or more of: the estimates of data to be routed through the different communication paths by avoiding scheduling data to be communicated through at least one of the communication paths having a larger estimate of data, the amounts of the data to be communicated through the different node devices by avoiding scheduling data to be communicated through at least one of the node devices having a larger amount of the data to be communicated through the at least one of the node devices, and/or the time periods in which different communications of the data occur during the communication cycle of the node device by scheduling the different communications to occur during non-overlapping time periods in the communication cycle.

In one example, determining the one or more of estimates of data, amounts of data, or time periods and generating the schedules occur at plural scheduling controllers disposed within the node devices of the time sensitive network.

In one example, the method also includes coordinating the schedules of the node devices with each other.

In one example, the schedules dictate times and data to be communicated at the times for communication of the data between one or more writer devices and one or more reader devices of a data distribution service through the time sensitive network.

In one example, determining the amounts of the data to be communicated through the different node devices uses tensors to represent the amounts of the data.

In one example, the schedules are generated by avoiding communicating the data through the routing circuitry responsive to the amount of data to be communicated along a communication path in the time sensitive network exceeding a designated upper limit.

In one example, the schedules are generated by determining whether the different communications of data through the same node device will overlap in time during the communication cycle and generating the schedules to avoid the overlap in time of the different communications of data.

In one example, the schedules are generated to avoid the overlap in time responsive to a quality of service parameter of at least one of the different communications of data decreasing below a lower limit but remaining above a tolerance associated with the lower limit.

In one embodiment, a communication system includes node devices configured to route data packets between one or more writer devices of a data distribution service and one or more reader devices of the data distribution service according to schedules of the node devices. Each of the node devices includes a scheduling controller that determines the schedule for the corresponding node device.

In one example, the node devices are configured to route the data packets in a time sensitive network.

In one example, the scheduling controllers of the node devices are configured to communicate with each other to coordinate the schedules of the respective node devices with each other.

In one example, the scheduling controllers are configured to generate the schedules using tensors representative of data traffic through one or more of the node devices.

In one example, the scheduling controllers are configured to generate the schedules by determining whether different communications of data through the same node device will overlap in time during a communication cycle and generating the schedules to avoid the overlap in time of the different communications of data through the same node device.

It is to be understood that the above description is intended to be illustrative, and not restrictive. For example, the above-described embodiments (and/or examples thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A node device comprising:
routing circuitry configured to receive data from one or more other node devices within a communication network and to send the data to at least one other node device or a final destination device; and
a scheduling controller configured to generate schedules for sending the data through the routing circuitry within the communication network, wherein the scheduling controller communicates with one or more other scheduling controllers in the one or more other node devices to generate the schedules for sending the data through the communication network
wherein the communication network is configured to operate as a time sensitive network, and wherein the scheduling controller is configured to generate the schedules for communication of the data between one or more writer devices and one or more reader devices of a data distribution service through the time sensitive network, wherein the one or more writer devices generate the data and the one or more reader devices read the data,
and wherein the scheduling controller is configured to generate the schedules for communication of the data by estimating one or more of an amount of data communicated through the routing circuitry or a bandwidth consumed by the amount of data communicated through the routing circuitry and avoiding communicating the data through the routing circuitry responsive to the one or more of the amount of data or the bandwidth consumed exceeding a designated upper limit, and wherein the scheduling controller is configured to estimate the one or more of the amount of data communicated through the routing circuitry or the bandwidth consumed by the amount of data communicated through the routing circuitry as a first order approximation using network calculus based on a source of the data and previous communications by the one or more other node devices.

2. The node device of claim 1, wherein the scheduling controller is configured to communicate with the one or more other scheduling controllers in the one or more other node devices in order to coordinate the schedules of the node device and the one or more other node devices with each other.

3. The node device of claim 1, wherein the scheduling controller is configured to generate the schedules for communication of the data using tensors representative of data traffic through one or more of the routing circuitry or the one or more other node devices.

4. The node device of claim 1, wherein the scheduling controller is configured to generate the schedules by determining whether different communications of data through the routing circuitry will overlap in time during a communication cycle and generating the schedules to avoid the overlap in time of the different communications of data through the routing circuitry.

5. The node device of claim 4, wherein the scheduling controller is configured to generate the schedules to avoid the overlap in time responsive to a quality of service parameter of at least one of the different communications of data decreasing below a lower limit but remaining above a tolerance associated with the lower limit.

6. A vehicle comprising:
the node device of claim 1;
the communication network;
a control system; and
the one or more writer devices and the one or more reader devices, wherein one of the one or more writer devices is a sensor configured to generate the data as sensor data, and one of the one or more reader devices is the control system, the control system configured to control movement of the vehicle based on the sensor data.

7. A communication system comprising:
node devices configured to route data packets between one or more writer devices of a data distribution service and one or more reader devices of the data distribution service according to schedules of the node devices, wherein each of the node devices includes a scheduling controller that determines the schedule for the corresponding node device, and wherein the scheduling controllers of the node devices are configured to communicate with each other to coordinate the schedules of the respective node devices with each other, and wherein the scheduling controller is configured to estimate one or more of the amount of data communicated through a routing circuitry or a bandwidth consumed by the amount of data communicated through the routing circuitry as a first order approximation using network calculus based on a source of the data and previous communications by one or more of the node devices.

8. The communication system of claim 7, wherein the node devices are configured to route the data packets in a time sensitive network.

9. The communication system of claim 7, wherein the scheduling controllers are configured to generate the schedules using tensors representative of data traffic through one or more of the node devices.

10. The communication system of claim 7, wherein the scheduling controllers are configured to generate the schedules by determining whether different communications of data through the same node device will overlap in time during a communication cycle and generating the schedules to avoid the overlap in time of the different communications of data through the same node device.

* * * * *